April 11, 1939.　　　A. KATZINGER　　　2,153,759

KNIFE

Filed Jan. 13, 1937

Inventor
Arthur Katzinger
By Stanley Hoods
Attorney

Patented Apr. 11, 1939

2,153,759

UNITED STATES PATENT OFFICE 2,153,759

KNIFE

Arthur Katzinger, Glencoe, Ill., assignor to Edward Katzinger Company, Chicago, Ill., a corporation of Illinois Application January 13, 1937, Serial No. 120,401

1 Claim. (Cl. 30—286)

This invention relates to knives generally and paring knives particularly and has for its object the formation of a knife blade to partly conform to the curvature or contour of the fruit or vegetable being peeled or pared, thereby facilitating the peeling or paring operation by permitting the cutting over a larger area and reducing the waste of the body of the fruit or vegetable adhering to the peelings or parings cut therefrom.

Another object of the present invention is to firmly and securely mount and position a finger rest adjoining the inner end of the handle extending over the blunt or unsharpened edge of the knife blade.

With the above and other objects in view, as will be apparent, this invention consists in the construction, combination and arrangement of parts, all as hereinafter more fully described, claimed and illustrated in the accompanying drawing, wherein:

Figure 1:
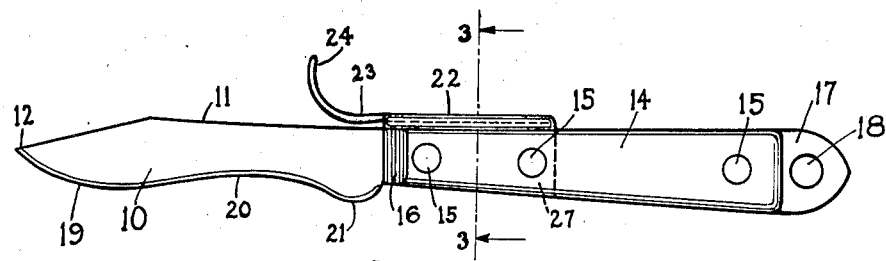
Fig. 1 is a side elevation of a paring knife constructed in accordance with the present invention.
Figure 2:
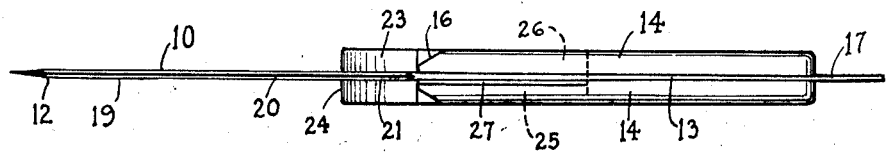
Fig. 2 is an edge elevation in the direction of the sharpened or cutting edge of the knife blade.
Figure 3:
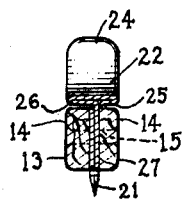
Fig. 3 is a transverse section taken through the handle of the knife along line 3—3 of Fig. 1.

The usual and customary paring knife prior to this invention has had a substantially straight, or perhaps slightly curved cutting edge that could contact and operate upon a relatively small area of the fruit or vegetable being peeled or pared and to increase the size of the area operated upon to remove a greater section of skin or rind in a single cut, it has been necessary to cut deeper into the body of the fruit or vegetable thereby causing an appreciable percentage of the body of the fruit or vegetable to adhere to the removed skin or rind with an attendant waste thereof.

The present invention contemplates a knife blade that will have a substantial portion of its cutting edge curved inwardly so that a greater length thereof can have intimate contact with the exterior surface of a vegetable or fruit thereby permitting a relatively large, shallow or thin cut to be taken.

Where a great deal of paring or peeling is done the forefinger of the operator resting and exerting pressure on the blunt or unsharpened edge of the blade becomes grooved and frequently sore and bruised and to prevent this a shield or guard over the unsharpened edge of the blade adjoining the inner end of the knife handle has heretofore been provided as a rest for the fore or index finger of the operator.

The present invention has in view such a shield, finger rest or guard, so fixed with reference to the handle of the knife that it is a permanent part thereof and braces and strengthens said handle. Furthermore, the shield or rest hereof is formed from a single strip of material and hence, is simple, inexpensive and easily formed and mounted and yet strong and durable.

Reference being had more particularly to the drawing, 10 indicates a knife blade having a relatively straight unsharpened or blunt non-cutting edge 11 and the acute point or toe 12, which is of course desirable but not essential in paring knives. The end of the blade 10 opposed to the toe 12 is provided with a coplanar handle shank 13. This shank 13 has the hande of the knife secured thereto; consisting of two relatively thick handle sections 14 of any suitable material, placed on opposite sides of the shank by a series of rivets 15 piercing the sections 14 and shank 13. It will be observed that the heads of the rivets 15 are counter-sunk in the handle sections 14 and that said handle sections are as wide and no wider than the width of the shank. Hence, if it is desired to have the handle taper toward the heel of the blade 10 (as shown) both the handle sections 14 and shank 13 are correspondingly and similarly tapered, or if it be so desired the edges of these elements may be straight or curved. The extremities of the handle sections 14 adjoining the heel of the blade 10 are, for convenience of manipulation, beveled as at 16.

The outer terminal 17 of the shank 13 projects beyond the outer ends of the handle sections 14 and has its edge curved, pointed or otherwise shaped. An aperture 18 is provided centrally in this projecting extension 17 of the shank 13 as a means of hanging or suspending the knife.

The sharpened or cutting edge of the blade 10 is somewhat serpentine in outline, curving outwardly, as at 19, from the toe 12 of the blade and then curving inwardly, as at 20, about centrally of the length of the blade, and finally again curving outwardly, as at 22 at the heel of the blade adjoining the inner end of the knife handle. The inwardly curved portion 20 of the blade 10 is relatively long and shallow and approximates the curvature or contour of a portion of the exterior of a fruit or vegetable. Manifestly, this inwardly curved section 20 of the cutting edge of the knife blade 10 may have any desirable outline or curve. That portion 19 of the cutting edge of the blade 10 can be used in the same manner as the straight or outwardly full curved cutting edges of the knives prior hereto, i. e., for cutting over a relatively narrow or limited surface while the inwardly curved portion 20 of the cutting edge is designed to be used to make relatively wide, shallow cuts.

The finger rest 22 consists of a substantially rectangular sheet of metal resting above and parallel to the inner ends of the upper edges of the shank 13 and handle sections 14. At the end thereof adjoining the knife blade 10 the finger rest 22 is provided with an extension 23 positioned above the non-cutting edge 11 of the blade 10 and at and near its extremity curving away from the blade edge 11, as at 24.

In order to permanently mount the finger rest 22 on the knife, the longitudinal edges thereof are provided with flanges 25, 26, which are bent to rest under and flush against the under or inner surface of the rest 22, said flanges terminating adjoining one another in alignment with the approximate longitudinal center of the finger rest. At its edge the flange 25 has a plate 27 formed thereon and at right angles thereto. Projecting between one of the handle sections 14 and the shank 13, the plate 17 is gripped between that handle section 14 and the shank and is there held by the rivets 15 also passing through the plate 27. While it is only necessary to have one of the rivets 15 pass through the plate 27, it is considered better to pass two of the rivets therethrough the plate, thereby providing a more substantial mounting for the rest 22.

This plate 27 is of a shape and size to be coextensive with the adjoining and cooperative portion of the shank 13 and handle section 14, so that the edges and sides of the handle are smooth and unbroken by any projecting parts.

From the foregoing, it is manifest that that portion of the finger rest 22 positioned over the handle is to all intents and purposes a part of the handle while the extension 23 thereof projecting over the unsharpened edge 11 of the blade 10 prevents the fore or index finger of the user from bearing or pressing on such unsharpened edge and that the rest constitutes in effect an integral, substantial part of the knife.

What is claimed is:

The combination with a knife blade having an unsharpened edge and a handle shank, of a handle section fixed to each side of said shank and having an edge in alignment with the unsharpened edge of said blade, a finger rest flush upon the edge of the handle sections aligned with the unsharpened edge of the blade and having an extension positioned forwardly of said handle sections, and an angularly disposed plate on said rest engaged between one handle section and said shank.

ARTHUR KATZINGER.